Figure 1:
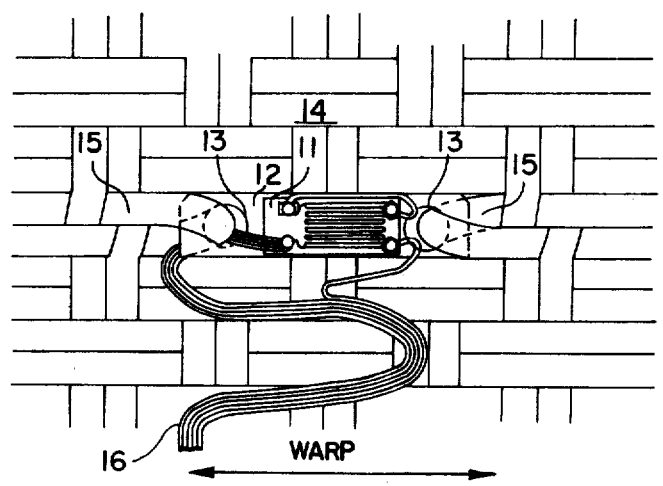

United States Patent [19]
Andrews et al.

[11] 4,038,867
[45] Aug. 2, 1977

[54] TRANSDUCER ASSEMBLY AND METHOD OF MANUFACTURING SAME

[75] Inventors: Arthur William Andrews, East Cowes; Eric Lewis Heber, Wootton; John Roger Michelmore, Ryde; John Nicholis, Wootton, all of England

[73] Assignee: British Hovercraft Corporation Limited, Yeovil, England

[21] Appl. No.: 659,356

[22] Filed: Feb. 19, 1976

[30] Foreign Application Priority Data

Feb. 24, 1975 United Kingdom ............ 11714/75

[51] Int. Cl.² .............................................. G01B 7/16
[52] U.S. Cl. .................................. 73/88.5 R; 338/6
[58] Field of Search ..................... 73/88.5 R; 338/6

[56] References Cited
U.S. PATENT DOCUMENTS

| | | | |
|---|---|---|---|
| 3,118,301 | 1/1964 | Bajenski et al. | 73/88.5 R |
| 3,332,280 | 7/1967 | Fish et al. | 73/88.5 R |

FOREIGN PATENT DOCUMENTS

| | | | |
|---|---|---|---|
| 2,148,190 | 4/1973 | Germany | 73/88.5 R |

*Primary Examiner*—James J. Gill
*Assistant Examiner*—Anthony V. Ciarlante
*Attorney, Agent, or Firm*—Larson, Taylor and Hinds

[57] ABSTRACT

This invention relates to a transducer assembly for measuring loads in flexible sheet material, and to a method of making the transducer assembly.

A strain gauged transducer plate is bonded between first and second sheets of flexible material, and a lead out cable from the strain gauge is sandwiched between spaced, mating PTFE (polytetrafluoroethylene) tapes attached to each flexible sheet. The cable is arranged in a generally sinusoidal pattern so that the cable crosses the space between the tapes at a plurality of locations throughout the length of the tapes and so that at each location the cable crosses the space in a direction generally perpendicular to the longitudinal direction thereof, thereby preventing damage and breakage of the tapes due to operational flexing of the transducer assembly.

In a preferred embodiment, the transducer plate is secured in an aperture in a woven fabric sheet which is then bonded between the flexible sheets. The plate is secured in the plane of the woven sheet by a thread of the sheet being passed through a hole at each end of the plate and re-weaving the thread back into the sheet.

18 Claims, 7 Drawing Figures

U.S. Patent  Aug. 2, 1977  Sheet 3 of 3  4,038,867
FIG. 6
FIG. 7
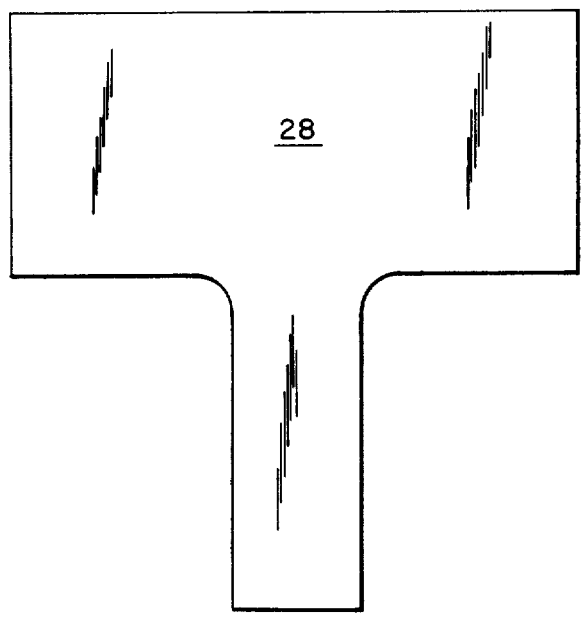
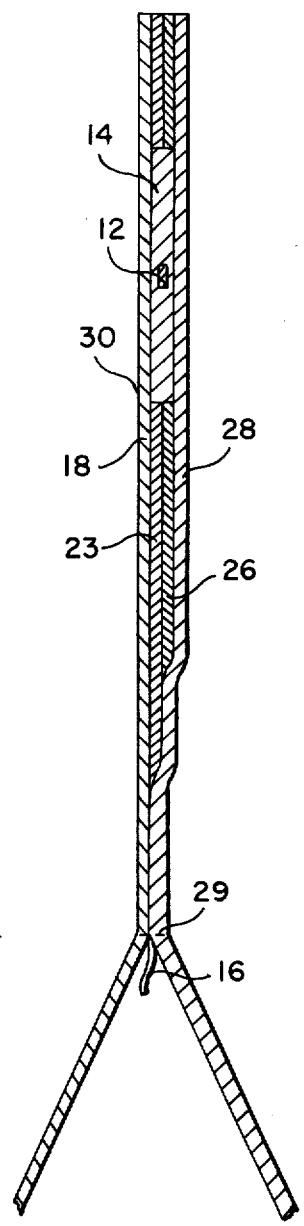

TRANSDUCER ASSEMBLY AND METHOD OF MANUFACTURING SAME

This invention relates to transducer assemblies and a method of making same, and is particularly concerned with transducer assemblies for measuring loads in flexible sheet material.

In prior arrangements for measuring loads in flexible sheet material. material, a strain gauge and associated lead out cable have been bonded between flexible sheets and problems have been encountered in that breakage and other damage has occurred to the cable. This damage is caused by tension and fatigue due to continual operational flexing, extension and retraction of the flexible sheet material in which loads are being measured, and attempts to solve the problem by arranging the cable in zig-zag or meandering patterns have been unsuccessful.

In one aspect the invention provides a transducer assembly comprising at least one strain gauge attached to a transducer plate bonded between first and second sheets of flexible material, and a cable having a requisite number of electrical conductors attached to the strain gauge and arranged to extend from an edge of the assembled sheets, wherein a pair of spaced PTFE (polytetrafluoroethylene) tapes are attached to mating surfaces of the said first and second sheets so that the pair of tapes attached to the second sheet overlie the pair of tapes attached to the first sheet when assembled, the tapes being arranged so that a longitudinal direction of the space between the tapes represents a mean route line of the cable, the cable being sandwiched between the mating pairs of tapes in a generally sinusoidal pattern so that the cable crosses the space at a plurality of separate separate locations throughout the length of the tapes and so that at each said location the cable crosses the space in a direction generally perpendicular to the longitudinal direction thereof.

The transducer plate may be provided with a hole at each end and may be located in an aperture through a flexible woven fabric sheet. Preferably, the transducer plate is secured at each end by a thread of the woven fabric sheet being passed through each hole and woven back on itself into the fabric sheet.

Due to its superior strength, stability and ease of rethreading, it is preferred that the transducer plate is secured by a warp thread.

The cable attached to the strain gauge may be routed between two PTFE tapes attached to the woven fabric sheet so that the cable protrudes from an edge of the sheet adjacent the space between the tapes on the first and second flexible sheets.

Preferably, the cable is arranged in a generally sinusoidal pattern between the two tapes attached to the woven fabric sheet.

The second sheet of fexible material may comprise a packing piece and may be provided with an aperture to locate over the woven fabric sheet to take up the thickness thereof, and the assembly may be completed by a further sheet of flexible material located over the second sheet. If necessary, further packing pieces may be used to make up the thickness of the woven fabric sheet.

Conveniently, in an assembly utilizing one or more packing pieces, the length of each piece in the direction of the length of the PTFE tapes may be progressively shorter so that when bonded one of the outer surfaces of the transducer assembly may have a stepped configuration and the other outer surface may be substantially planar.

The outer sheets of the assembly may be extended beyond the extremity of the PTFE tapes and, during bonding the sheets may preferably be joined to a position corresponding approximately with the extremity of the said tapes. The cable may be arranged to protrude from the said bonded edge between the extended parts of the sheets to facilitate the necessary connection on installation, and the extended parts may be bonded together following such connection.

In another aspect the invention provides a transducer assembly comprising at least one strain gauge attached to a transducer plate and a cable comprising a requisite number of electrical conductors attached to the strain gauge, wherein the transducer plate has a hole at each end and is secured in the plane of a woven fabric sheet in an aperture in the sheet by one of the warp threads of the sheet being passed through each hole and woven back on itself into the sheet, the cable being located in a generally sinusoidal pattern between two PTFE tapes attached to the woven sheet so that the cable protrudes from an edge of the woven sheet; the assembled woven sheet being located on a first sheet of flexible material having two spaced PTFE tapes attached thereto to extend from a position adjacent the position where the cable protrudes from the edge of the woven sheet, the tapes being arranged so that a longitudinal direction of the space between the tapes represents a mean route line of the cable; the cable being arranged in a generally sinusoidal pattern over the tapes so that the cable crosses the space in a plurality of locations throughout the length of the tapes and in each location is arranged substantially perpendicular thereto; second and third sheets of flexible material being laid over the first sheet, each havng an aperture to locate over the woven fabric sheet and a combined thickness substantially equal to the thickness of the woven fabric sheet; the second sheet having two spaced PTFE tapes attached to its inner surface to align with the tapes on the first flexible sheet so that the cable is sandwiched between the two pairs of tapes; a fourth sheet of flexible material laid over the third sheet; the assembled sheets being bonded together to secure the woven fabric sheet in the assembly and so that the cable is secured between the mating PTFE tapes only in the area of each location in which the cable crosses the space between the tapes.

In a further aspect the invention provides a method of making a transducer assembly characterized in that the method comprises the steps of a. locating a strain gauged transducer plate on a first sheet of flexible material having two spaced PTFE tapes attached thereto and arranged so that a longitudinal direction of the space between said tapes represents a desired mean route line of a cable from the transducer plate, b. laying the cable over the PTFE tapes in a generally sinusoidal pattern so that said cable crosses the space in a plurality of locations throughout the length of the tapes and in each location is arranged approximately perpendicular thereto, c. locating a second sheet of flexible material over the assembled parts, the second sheet having two spaced PTFE tapes attached to its inner surface to align with the tapes on the said first flexible sheet, and d. bonding the assembled parts so that the transducer plate is secured in the assembly and so that the said cable is secured between the mating PTFE tapes only in the area of each location in which the said cable crosses the space between the tapes.

In a yet further aspect the invention provides a method of making a transducer assembly characterized in that the method comprises the steps of a. attaching a strain gauged transducer plate to a woven fabric sheet by threading one of the threads of the sheet through the holes at each end of the plate and re-weaving the thread into the sheet, b. locating a cable from the strain gauge betwween two PTFE tapes attached to the woven sheet in a generally sinusoidal pattern so that the cable protrudes from an edge of the woven sheet, c. locating the woven fabric sheet on a first sheet of flexible material having two spaced PTFE tapes attached thereto to extend from a position adjacent the position where the cable protrudes from the edge of the woven sheet, the tapes being arranged so that a longitudinal direction of the space between the tapes represent a desired mean route line of the cable, d. laying the cable over the PTFE tapes in a generally sinusoidal pattern so that the cable crosses the space at a plurality of locations throughout the length of the tapes and in each location is arranged approximately perpendicular thereto, e. locating a second sheet of flexible material over the assembled parts, the second sheet being of approximately half the thickness of the woven fabric sheet and having an aperture to locate over the woven fabric sheet, and two spaced PTFE tapes attached to its surface to align with the tapes on the first flexible sheet, f. locating a third sheet of flexible material over the assembled parts, the third sheet being of approximately half the thickness of the woven fabric sheet and having an aperture to locate over the woven fabric sheet.

g. laying a fourth sheet of flexible material over the assembled parts, and h. bonding the assembled parts so that the woven fabric sheet is secured in the assembly and so that the cable is secured between the mating PTFE tapes only in the area of each location in which the cable crosses the space between the tapes.

Preferably, step (a) includes the further steps of: unthreading a pair of adjacent warp threads from opposite sides of the woven fabric sheet and as far as the nearest edge of the position in which the transducer plate is to be fitted; cutting an aperture in the fabric sheet of sufficient size to accommodate the transducer plate in the plane of the fabric; passing each unthreaded end of the warp threads through the hole at each end of the transducer plate; and re-weaving each thread back on itself in the space previously occupied by the other thread of the pair.

Figure 2:
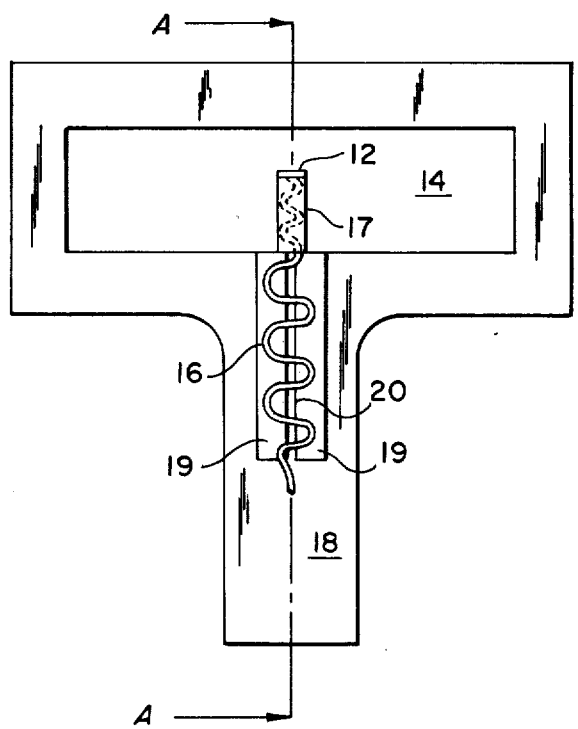
Figure 3:
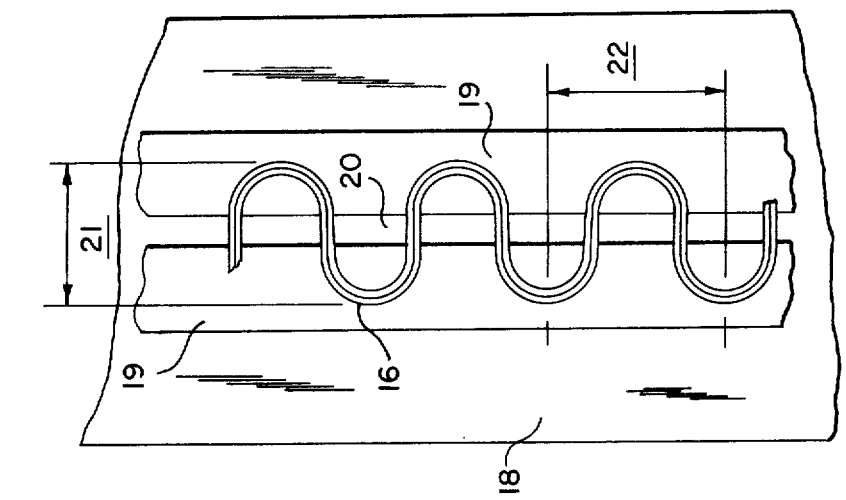

The invention will now be described by way of example only and with reference to the accompanying drawings, in which:

FIG. 1 is a plan view showing a preferred method of mounting a transducer plate, FIG. 2 is a plan view illustrating a further stage in an assembly procedure, FIG. 3 is an enlarged view of part of FIG. 2, FIGS. 4, 5 and 6 are plan views of further detail parts, and FIG. 7 is a sectioned view of an assembled transducer assembly according to the invention and taken on lines A-A of FIG. 2.

Referring now to FIG. 1, a strain gauge 11 is bonded to each surface of a metal transducer plate 12 having a hole 13 located adjacent each end. The transducer plate 12 is secured centrally of a nylon woven fabric sheet 14 pre-treated for Neoprene and elongated in a direction parallel to its warp threads. The plate 12 is attached by unthreading two central warp threads 15 from opposite edges of the woven fabric sheet 14 for as far as the nearest edge of the position in which the transducer plate 12 is to be fitted, and cutting in aperture through the woven sheet 14 so that the transducer plate is located in the aperture in the plane of the woven sheet 14. One of the threads 15 is then passed through the hole 13 at each end of the plate 12 and woven back on itself into the woven sheet 14 in the space previously occupied by the other thread, as shown in the drawing, to secure the plate 12 in position. Suitable connections are made to the strain gauge 11 which in the embodiment shown comprises a cable 16 consisting of three PTFE covered electrical conductor wires.

The assembled transducer plate 12 is then covered by a suitable insulating material and calibrated to appropriate operational loads. The cable 16 is located between two ⅛ in. wide strips of 0.002 in. thick PTFE tape 17 (FIG. 2) and arranged in a generally sinusoidal pattern so that the cable 16 protrudes from a longitudinal edge of the woven fabric sheet 14 and substantially centrally thereof.

Referring to FIG. 2, the assembled woven fabric sheet 14 and transducer plate 12 are shown located on a horizontal portion of a first T-shaped flexible sheet 18 of uncured Neoprene so that the cable 16 protrudes from the woven fabric sheet 14 generally centrally of the vertical section of the sheet 18.

Two ⅜ in. wide strips of 0.002 in. thick PTFE tape 19 are attached to an upper surface of the sheet 18 so as to extend from a position adjacent the edge of the woven fabric sheet 14 from which the cable 16 protrudes. The tapes 19 extend for approximately half the length of the vertical section of the sheet 18, and have a spacing 20 between adjacent edges thereof, the longitudinal direction of the spacing 20 representing the desired mean route line of the cable 16. The tapes 19 are attached to the sheet 18 by wiping contact surfaces with Toluene before assembly.

Cable 16 is layed over the tapes 19 in a generally sinusoidal pattern (FIGS. 2 and 3) and symmetrically about the spacing 20 so that the cable 16 crosses the spacing 20 in a plurality of separate locations throughout the length of the tapes 19, and does not extend beyond the outer edges of the tapes 19.

It is an important feature of the invention that the cable 16 is located on the tapes 19 so that at every location that the cable 16 crosses the spacing 20 the cable 16 is arranged perpendicular to the longitudinal direction of the spacing 20. To ensure correct positioning of the cable 16 a suitable template is used during assembly, the cable 16 being retained in position by thin strips of PTFE adhesive tape (not shown). The three wires of the cable 16 are laid flat on the tapes 19.

FIG. 3 is an enlarged view showing a preferred sinusoidal pattern for the cable 16. The width of the spacing 20 is ¼ in. and the sinusoidal pattern of the cable 16 comprise a width or amplitude 21 of 1¼ in. and a pitch 22 of 1¼ inches.

Figure 4:
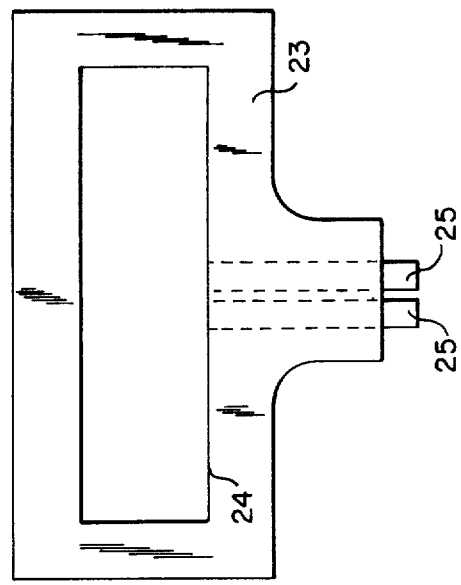

A second T-shaped flexible sheet 23 of uncured Neoprene is shown in FIG. 4. The flexible sheet 23 is approximately half the thickness of the woven fabric sheet and is provided with an aperture 24 in its horizontal section so as to fit over the fabric sheet 14 when assembled, in the form of a packing piece. Two ⅜ in. wide strips of 0.002 in. thick PTFE tape 25 are attached on its lower surface to extend from an edge of the aperture 24 along the vertical section of the sheet 23. The tapes are the same length as tapes 19 (FIG. 2) and are arranged to overlie the tapes 19 when the parts are assembled. The sheet 23 is of similar dimensions to the sheet 18 except that the vertical section is shorter and, as shown, is also slightly shorter (approximately 1.0 in. in the embodiment shown) than the tapes 25.

Figure 5:
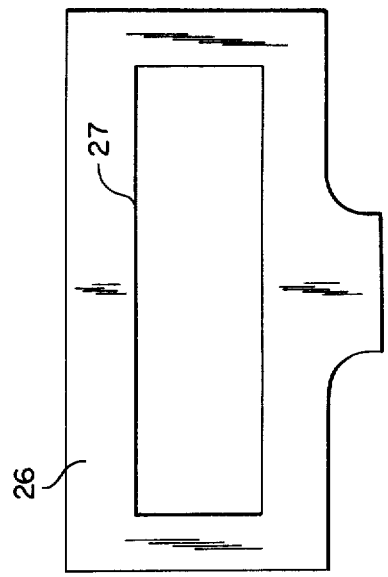

FIG. 5 illustrates a third T-shaped flexible sheet 26 of uncured Neoprene. The flexible sheet 26 is approximately half the thickness of the woven fabric sheet and is also provided with an aperture 27 to locate over the fabric sheet 14 when assembled, in the form of a second packing piece. The sheet 26 is of similar dimensions to flexible sheets 18 and 23, except that the vertical section is shorter than the vertical section of sheet 23 by approximately 1½ in.

A final component of the transducer assembly of this embodiment is shown in FIG. 6 and comprises a fourth T-shaped flexible sheet 28 of uncured Neoprene of similar dimensions to sheet 18 (FIG. 2).

The assembly procedure of a transducer assembly up to the stage shown in FIG. 2 has been described above, the remaining sequence now being decribed with particular reference to FIG. 7 which is a sectioned view taken along lines A—A of FIG. 2. The second flexible sheet 23 is located over the assembled parts shown in FIG. 2 so that the fabric sheet 14 is located through the aperture 24 and so that the tapes 25 overlie the tapes 19 to sandwich the curved sections of the cable 16 therebetween. The third flexible sheet 26 is now located over the sheet 23 so that the fabric sheet 14 is also located through the aperture 27, the flexible sheets 23 and 26 serving as packing pieces having a combined thickness substantially equal to the thickness of the woven fabric sheet 14. The fourth flexible sheet 28 is now laid over the assembled parts which are then heat bonded together as far as a position indicated by line 29 (FIG. 7) which corresponds to the extremity of the tapes 19 and 25.

It will be clear that the outer sheets of the assembly (sheets 18 and 28 in the particular embodiment described) are extended beyond the extremity of the tapes 19 and 25. This is illustrated in FIG. 7 by the free ends of the vertical sections of flexible sheets 18 and 28 being shown splayed slightly apart which also serves to illustrate the end of cable 16 protruding from the bonded transducer assembly to facilitate connection of the transducer assembly on installation. After connection the free ends of sheets 18 and 28 are cold bonded together at least at their extreme regions.

In the heat bonding process, pressure is applied to the assembly to ensure that a correct bond occurs between the first and second flexible sheets 18 and 23 within the area of the spacing 20 between the two tapes 19 on the first flexible sheet 18 and the two tapes 25 on the second flexible sheet 23 so as to ensure that the cable 16 is securely retained at each location where it crosses the space 20. It will be understood that no bond occurs over the area between the two facing pairs of PTFE tapes 19 and 25 respectively, between which the curved sections of the cable are sandwiched so that these sections of the cable 16 are unsecured.

In FIG. 7 it will be clear that the varying lengths of the vertical sections of the second and third flexible sheets 23 and 26 provides an assembly having a stepped outer surface, which ensures efficient retention of the parts, and a generally planar rear surface 30 to facilitate installation.

On installation, the transducer assembly is attached to a flexible sheet in which loads are to be measured by bonding the rear surface 30 of the assembly to the sheet as far as the position indicated at 29 (FIG. 7) corresponding to the bonded extremity of the transducer assembly.

In describing operation of the transducer assembly of the present invention it is not intended to include details of operation of the strain gauges 11 which is conventional and well known in the art. An important feature of the invention is the arrangement of the cable 16 between PTFE tapes 19 and 25 in such a manner that in each location that it crosses the space 20 it is perpendicular thereto, which ensures that any extension of the transducer assembly in the same direction as the mean route line of the cable 16 is permitted by the unsecured curved sections between the tapes 19 and 25 without imparting any load to the cable 16, thereby preventing breakage or other damage to the cable 16 during flexing of the sheet on which the transducer assembly is connected.

The sinusoidal pattern of the cable 16 within the pairs of tapes 19 and 25 is chosen so as to avoid excessive cable length yet retain the objective of the cable crossing the space 20 (or mean route line) perpendicularly to avoid stress concentrations, and results from a consideration of wave amplitude, idealized as a maximum, and wave length, idealized as a minimum. Typical satisfactory dimensions have been described in relation to the particular embodiment shown, but it will be understood that variations could be made to suit particular applications.

The transducer assembly hereinbefore described utilizes a cable 16 having three wires, however, it will be understood that the invention can readily be applied to an assembly utilizing any desired number of cables by adding a requisite number of PTFE tapes so that each cable with its requisite number of wires is arranged in the described pattern relative to a space between adjacent tapes representing the mean route line of the particular cable.

A transducer assembly according to the invention finds particular application in measuring loads in a hovercraft flexible skirt material which is subject to severe operational loads so that the advantages of the present inventions are particularly important. However, it will be apparent that these advantages could be effectively employed in many other areas in which it is necessary to measure loads in flexible material.

Whilst a preferred embodiment of the invention has been described and illustrated, it is to be understood that modifications can be made without departing from the scope of the appended claims. For instance, in an alternative embodiment, representing the simplest form of the invention, the flexible sheets 23 and 26 can be dispensed with so that the tapes 25 would be provided on the sheet 28 to mate with the tapes 19 on the sheet 18. In a further embodiment, the sheet 23 may be of sufficient thickness to take up the thickness of the woven fabric sheet 14, so that sheet 26 is not required. Alternatively, more than two sheets may be used to take up the thickness of the woven fabric sheet 14. Although it is preferred to use a warp thread to secure the transducer plate 12 due to its superior strength, stability and ease of re-threading, it is to be understood that a weft thread could be used and could depend on the particular application and parameter(s) to be measured. The invention is not limited to the T-shape transducer assembly hereinbefore described, and can be of any desired shape whilst incorporating the features of the invention. Materials other than those specified herein could be used.

We claim as our invention:

1. A transducer assembly comprising at least one strain gauge attached to a transducer plate bonded between first and second sheets of flexible material and a cable having a requisite number of electrical conductors attached to the strain gauge(s) and arranged to extend from an edge of the assembled sheets, wherein a pair of spaced PTFE tapes are attached to mating surfaces of the first and second sheets so that the pair of tapes attached to the second sheet overlie the pair of tapes attached to the first sheet when assembled, the tapes being arranged so that a longitudinal direction of the space between the tapes represents a mean route line of the cable, the cable being sandwiched between the mating pairs of tapes in a generally sinusoidal pattern so that the cable crosses the space at a plurality of separate locations throughout the length of the tapes and so that at each said location the cable crosses the space in a direction generally perpendicular to the longitudinal direction thereof.

2. A transducer assembly as claimed in claim 1, wherein the transducer plate has a hole at each end and is located in an aperture through a flexible woven fabric sheet, the transducer plate being secured at each end by a thread of the woven sheet being passed through each hole and woven back on itself into the sheet.

3. A transducer assembly as claimed in claim 2, wherein the thread is a warp thread.

4. A transducer assembly as claimed in claim 3, wherein the second sheet of flexible material comprises a packing piece provided with an aperture to locate over the woven fabric sheet to take up the thickness thereof, the assembly being completed by a further sheet of flexible material located over the packing piece.

5. A transducer assembly as claimed in claim 4, wherein at least one further packing piece is used to make up the thickness of the woven fabric sheet.

6. A transducer assembly as claimed in claim 5, wherein the length of each further packing piece in the directon of the PTFE tapes is progressively shortened so that one outer surface of the assembly has a stepped configuration and the other outer surface is substantially planar.

7. A transducer assembly as claimed in claim 6, wherein the outer flexible sheets of the assembly extend beyond the extremity of the PTFE tapes and are joined to a position corresponding approximately with the extremity of the tapes, the cable protruding from the bonded edge between the sheets of flexible material.

8. A transducer assembly as claimed in claim 2, wherein the cable is routed between two PTFE tapes attached to the woven fabric sheet so as to protrude from an edge of the woven fabric sheet adjacent the space between the tapes on the first and second flexible sheets.

9. A transducer assembly as claimed in claim 8, wherein at least one further packing piece is used to make up the thickness of the woven fabric sheet.

10. A transducer assembly as claimed in claim 9, wherein the length of each further packing piece in the direction of the PTFE tapes is progressively shortened so that one outer surface of the assembly has a stepped configuration and the other outer surface is substantially planar.

11. A transducer assembly as claimed in claim 10, wherein the outer flexible sheets of the assembly extend beyond the extremity of the PTFE tapes and are joined to a position corresponding approximately with the extremity of the tapes, the cable protruding from the bonded edge between the sheets of flexible material.

12. A transducer assembly as claimed in claim 8, wherein the cable is arranged in a generally sinusoidal pattern between the two PTFE tapes attached to the woven fabric sheet.

13. A transducer assembly as claimed in claim 8, wherein the second sheet of flexible material comprises a packing piece provided with an aperture to locate over the woven fabric sheet to take up the thickness thereof, the assembly being completed by a further sheet of flexible material located over the packing piece.

14. A transducer assembly as claimed in claim 2, wherein the second sheet of flexible material comprises a packing piece provided with an aperture to locate over the woven fabric sheet to take up the thickness thereof, the assembly being completed by a further sheet of flexible material located over the packing piece.

15. A transducer assembly as claimed in claim 14, wherein at least one further packing piece is used to make up the thickness of the woven fabric sheet.

16. A transducer assembly as claimed in claim 15, wherein the length of each further packing piece in the direction of the PTFE tapes is progressively shortened so that one outer surface of the assembly has a stepped configuration and the other outer surface is substantially planar.

17. A transducer assembly as claimed in claim 16, wherein the outer flexible sheets of the assembly extend beyond the extremity of the PTFE tapes and are joined to a position corresponding approximately with the extremity of the tapes, the cable protruding from the bonded edge between the sheets of flexible material.

18. A transducer assembly comprising at least one strain gauge attached to a transducer plate and a cable comprising a requisite number of electrical conductors attached to the strain gauge, wherein the transducer plate has a hole at each end and is secured in the plane of a woven fabric sheet in an aperture in the sheet by one of the warp threads of the sheet being passed through each hole and woven back on itself into the sheet, the cable being located in a generally sinusoidal pattern between two PTFE tapes attached to the woven sheet so that the cable protrudes from an edge of the woven sheet; the assembled woven fabric sheet being located on a first sheet of flexible material having two spaced PTFE tapes attached thereto to extend from a position adjacent the position where the cable protrudes from the edge of the woven sheet, the tapes being arranged so that a longitudinal direction of the space between the tapes represents a mean route line of the cable; the cable being arranged in a generally sinusoidal pattern over the tapes so that the cable crosses the space in a plurality of locations throughout the length of the tapes and in each location is arranged substantially perpendicular thereto; second and third sheets of flexible material being laid over the first sheet, each having an aperture to locate over the woven fabric sheet and a combined thickness substantially equal to the thickness of the woven fabric sheet; the second sheet having two spaced PTFE tapes attached to its inner surface to align with the tapes on the first flexible sheet so that the cable is sandwiched between the two pairs of tapes; a fourth sheet of flexible material laid over the third sheet; the assembled sheets being bonded together to secure the woven fabric sheet in the assembly and so that the cable is secured between the mating PTFE tapes only in the area of each location in which the cable crosses the space between the tapes.

* * * * *